US012583397B1

(12) United States Patent
Lee, II et al.

(10) Patent No.: US 12,583,397 B1
(45) Date of Patent: Mar. 24, 2026

(54) MODULAR TRUCK BED STORAGE SYSTEM

(71) Applicant: Dynamic Manufacturing Group LLC, Palmetto, FL (US)

(72) Inventors: Ronald James Lee, II, Ruskin, FL (US); Bradly Martin, Ruskin, FL (US); Anthony Sansone, Parrish, FL (US)

( * ) Notice: Subject to any disclaimer, the term of this patent is extended or adjusted under 35 U.S.C. 154(b) by 0 days.

(21) Appl. No.: 19/206,838

(22) Filed: May 13, 2025

(51) Int. Cl.
| | |
|---|---|
| *B60R 9/06* | (2006.01) |
| *A01K 97/10* | (2006.01) |
| *B60R 11/06* | (2006.01) |

(52) U.S. Cl.
CPC .............. *B60R 9/065* (2013.01); *A01K 97/10* (2013.01); *B60R 11/06* (2013.01)

(58) Field of Classification Search
CPC ................................ B60R 9/065; B60R 11/06
USPC ...................... 224/403, 404, 922; D12/414.1
See application file for complete search history.

(56) References Cited

U.S. PATENT DOCUMENTS

| | | | | |
|---|---|---|---|---|
| 3,587,486 A | * | 6/1971 | Heinrichs .............. | A47B 17/00 |
| | | | | 109/51 |
| 3,664,704 A | * | 5/1972 | Ellis ......................... | B60P 7/08 |
| | | | | 224/543 |
| D257,340 S | * | 10/1980 | Grossman ...................... | D3/905 |
| 4,288,011 A | * | 9/1981 | Grossman ............ | B65D 21/086 |
| | | | | 224/404 |
| 4,705,317 A | * | 11/1987 | Henri ..................... | B62D 33/02 |
| | | | | 224/543 |

| | | | | |
|---|---|---|---|---|
| 4,770,330 A | * | 9/1988 | Bonstead ................ | B60R 11/06 |
| | | | | 224/404 |
| 4,850,519 A | * | 7/1989 | Farmer, Jr. ................ | B60R 9/00 |
| | | | | 224/404 |
| 4,921,152 A | * | 5/1990 | Kemming ............... | B60R 11/06 |
| | | | | 224/543 |
| 5,419,476 A | * | 5/1995 | White ........................ | B60R 9/00 |
| | | | | 224/404 |
| 5,435,473 A | * | 7/1995 | Larkum .................... | B60R 9/08 |
| | | | | 211/70.8 |
| 5,484,092 A | | 1/1996 | Cheney | |
| 5,494,315 A | * | 2/1996 | Heltenburg ............ | B62D 33/02 |
| | | | | 280/759 |
| 5,605,264 A | * | 2/1997 | Neal ......................... | B60P 3/14 |
| | | | | 224/404 |

(Continued)

*Primary Examiner* — Justin M Larson
(74) *Attorney, Agent, or Firm* — Derek Fahey, Esq.; The Plus IP Firm, PLLC

(57) ABSTRACT

A modular truck bed storage system is disclosed. The system includes a first storage container and a second storage container, each having a shoulder portion configured to engage with a truck bed wall. A connector assembly is positioned between and attached to the first storage container and the second storage container, structurally securing them together to form a unitary structure within the truck bed. The system further includes an interchangeable module, which is removably retained within an interstitial space defined between the first and second storage containers. The interchangeable module may include a storage container, a cooler, or a live well, among other configurations. The system also incorporates pivotally mounted lids providing lateral access openings along outer edges proximate to the truck bed rails. Additionally, the system may include independent locking mechanisms for secure storage and an accessory mounting interface with multiple attachment points for customization.

17 Claims, 15 Drawing Sheets

(56)          References Cited

U.S. PATENT DOCUMENTS

| | | | | |
|---|---|---|---|---|
| 5,687,895 | A * | 11/1997 | Allison | B60R 7/02 |
| | | | | 224/404 |
| 5,845,952 | A | 12/1998 | Albertini et al. | |
| 5,979,725 | A * | 11/1999 | Lehrman | B60R 7/02 |
| | | | | 220/23.88 |
| 5,988,473 | A * | 11/1999 | Hagan | B60R 9/00 |
| | | | | 312/328 |
| 6,079,741 | A * | 6/2000 | Maver | B62D 49/0628 |
| | | | | 224/404 |
| 6,467,779 | B1 * | 10/2002 | Mills | B62B 1/10 |
| | | | | 280/30 |
| 6,629,714 | B2 | 10/2003 | Campbell | |
| 6,641,013 | B2 | 11/2003 | Dise | |
| 6,913,304 | B1 * | 7/2005 | Sweet | B60R 16/0231 |
| | | | | 211/20 |
| 6,935,670 | B2 * | 8/2005 | Bright | B60P 3/075 |
| | | | | 410/23 |
| 7,494,171 | B2 * | 2/2009 | Martin | B60R 9/00 |
| | | | | 224/403 |
| 7,794,003 | B2 * | 9/2010 | Crandall | B60R 9/00 |
| | | | | 224/403 |
| 9,193,290 | B2 * | 11/2015 | Lazarevich | B60P 3/14 |
| 9,238,437 | B2 | 1/2016 | Lang et al. | |
| 9,914,402 | B1 * | 3/2018 | Jones | B60R 9/08 |
| 9,962,826 | B1 * | 5/2018 | Surridge | B25H 3/028 |
| 9,986,827 | B1 * | 6/2018 | Long | A47B 81/005 |
| 10,629,016 | B1 | 4/2020 | Helm | |
| 10,730,446 | B2 | 8/2020 | Wilson | |
| 10,814,926 | B2 | 10/2020 | White et al. | |
| 11,414,928 | B2 * | 8/2022 | Allan | B65D 25/02 |
| 12,011,981 | B2 | 6/2024 | Mohr, IV | |
| 12,060,014 | B2 | 8/2024 | Wall | |
| 12,280,707 | B2 * | 4/2025 | Gros | B60R 9/065 |
| 12,370,955 | B2 * | 7/2025 | Eloff | B62D 33/0207 |
| 2004/0094589 | A1 * | 5/2004 | Fricano | B60R 11/06 |
| | | | | 224/404 |
| 2023/0271543 | A1 | 8/2023 | Gros et al. | |

* cited by examiner

MODULAR TRUCK BED STORAGE SYSTEM

REFERENCE TO RELATED APPLICATIONS

Not applicable.

CROSS-REFERENCES

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISK

Not applicable.

TECHNICAL FIELD

The present disclosure relates to the field of cargo management and storage solutions for vehicles, and more specifically to the field of modular truck bed storage systems that include interconnected storage containers and interchangeable modules

BACKGROUND OF THE INVENTION

Pickup trucks are commonly used for transporting cargo and equipment, and many truck owners seek secure and organized storage solutions for their truck beds. Traditional truck bed storage systems include toolboxes, cargo bins, and tonneau covers, which offer varying degrees of security, weather protection, and organization. However, these conventional storage solutions suffer from several drawbacks.

One common approach in the prior art is the use of single-compartment truck toolboxes, which are typically mounted across the width of the truck bed near the cab. While these toolboxes provide lockable storage, they occupy valuable bed space and lack modularity, limiting their ability to accommodate different cargo needs or provide portability. Additionally, many of these toolboxes require permanent installation, reducing flexibility for users who may need to reconfigure their truck bed for different purposes.

Some truck owners use removable storage bins or cargo organizers to improve truck bed organization. While these options offer some versatility, they generally lack security features and are not fixed in place, making them prone to shifting during transport. Moreover, these bins are often not weatherproof, exposing stored items to environmental damage.

The prior art also includes bed drawer systems that provide pull-out compartments for organized storage. While these systems improve accessibility, they often require permanent installation and can significantly raise the floor of the truck bed, reducing overall cargo capacity. Additionally, these drawer systems typically lack modularity, preventing customization based on the user's needs.

Accordingly, there remains a need for a modular truck bed storage system that provides secure, customizable, and space-efficient storage while maintaining a unitary structure. An improved storage system should allow for interchangeable modules, ensuring that users can configure their truck bed for different storage applications, such as standard storage, cooling compartments, or specialized utility enclosures. Furthermore, such a system should be easy to install and reconfigure without requiring permanent modifications to the truck bed.

As a result, there exists a need for improvements over the prior art and, more particularly, for a truck bed storage system that maximizes storage capacity while maintaining accessibility, provides secure and organized storage without limiting the versatility of the truck bed, and offers a more adaptable and efficient solution for accommodating different storage needs.

BRIEF SUMMARY OF THE INVENTION

A system and method for a modular truck bed storage system is disclosed. This Summary is provided to introduce a selection of disclosed concepts in a simplified form that are further described below in the Detailed Description, including the drawings provided. This Summary is not intended to identify key features or essential features of the claimed subject matter. Nor is this Summary intended to be used to limit the claimed subject matter's scope.

In one embodiment, a modular truck bed storage system is disclosed. The system includes a first storage container and a second storage container, each having a shoulder portion configured to engage with a truck bed wall of a vehicle; a connector assembly positioned between the first storage container and the second storage container; and an interchangeable module removably disposed between the first storage container and the second storage container. In an assembled configuration, the first storage container, the second storage container, the connector assembly, and the interchangeable module collectively form a unitary structure within a truck bed of the vehicle.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein.

Figure 1:
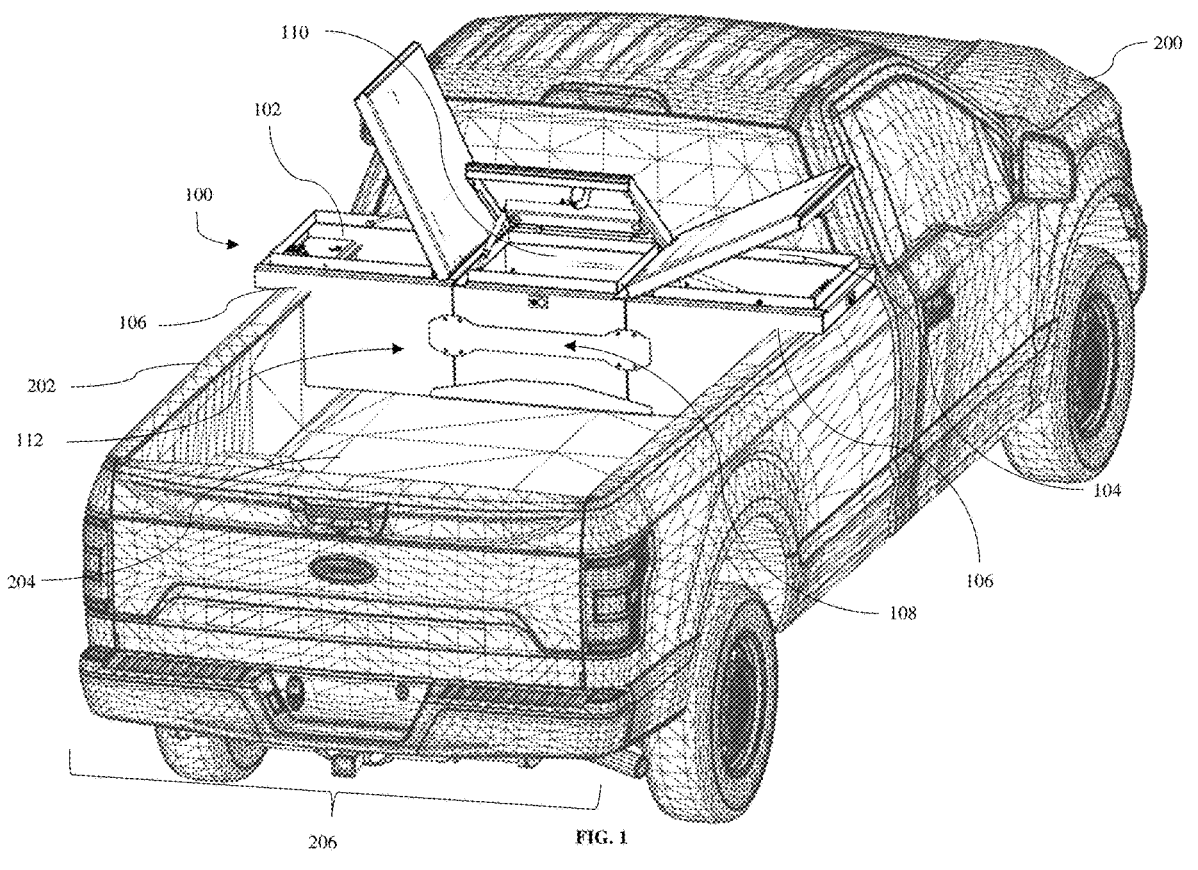
FIG. 1 is a perspective view of a modular truck bed storage system in a first example embodiment of an assembled configuration, according to an example embodiment.

Like reference numerals refer to like parts throughout the various views of the drawings. The figures are drawn to scale; however, the specific proportions and dimensions shown are provided for illustrative purposes and do not limit the scope of the disclosure. While the embodiments depicted in the figures represent example implementations of the disclosure, the disclosure is not limited to these specific configurations. Modifications, variations, and alternative designs may be made without departing from the scope and spirit of the disclosure as defined by the appended claims.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a modular and configurable truck bed storage system that enhances shipping efficiency, adaptability, security, and accessibility, while overcoming the limitations of conventional truck bed storage solutions.

One key improvement over the prior art is compact shipping efficiency. The disclosed system is designed so that the first and second storage containers, the connector assembly, and the interchangeable module can be efficiently arranged on a pallet for shipping in a compact manner. This reduces freight costs, storage space, and handling complexity, making distribution and inventory management more efficient.

Another important improvement is the interchangeability of storage modules. Unlike fixed or dedicated truck bed storage solutions, the disclosed system utilizes a base plate and a crossbar to structurally connect the first and second storage containers while defining an interstitial space between them. This space allows for an interchangeable module to be securely retained between the containers, providing users with flexibility to configure the storage system for different needs. Users can insert various modules, such as coolers, toolboxes, live wells, pack-out systems, or custom storage units, without being limited to accessories that specifically mate with the storage containers.

Additionally, the disclosed system improves access and usability compared to prior art storage solutions. Many conventional truck storage boxes require users to access storage compartments from the top or rear of the truck bed, which can be cumbersome. In contrast, the present system allows the first and second storage containers to include pivotally mounted lids that open from an inner edge, creating lateral access openings along the outer edges adjacent to the truck bed rails. This design enables users to retrieve stored items without reaching deep into the truck bed, enhancing convenience and ergonomic access.

The system also provides enhanced security features. Each of the first storage container, the second storage container, and the interchangeable module can include independent locking mechanisms, allowing users to securely isolate specific compartments without affecting access to the rest of the system. This is particularly advantageous for storing valuables, tools, or perishable items that require controlled access.

Furthermore, the disclosed system incorporates an accessory mounting interface, which provides multiple attachment points for mounting various accessories, such as gun racks, fishing rod holders, additional tool storage, or tie-down points for securing cargo. This level of expandability and customization is not typically available in conventional truck bed storage systems.

Figure 2:
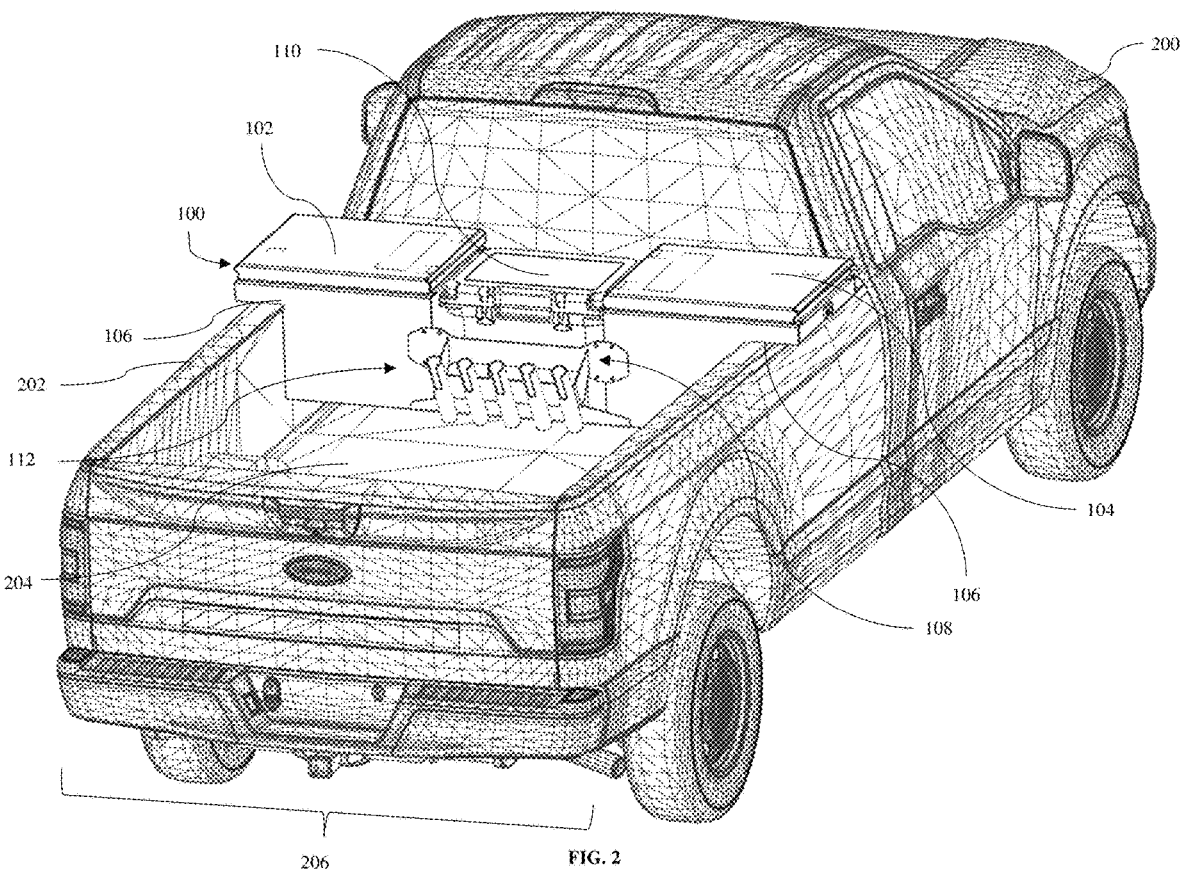
FIG. 2 is a perspective view of a modular truck bed storage system in a second example embodiment of an assembled configuration, according to an example embodiment.
Figure 3:
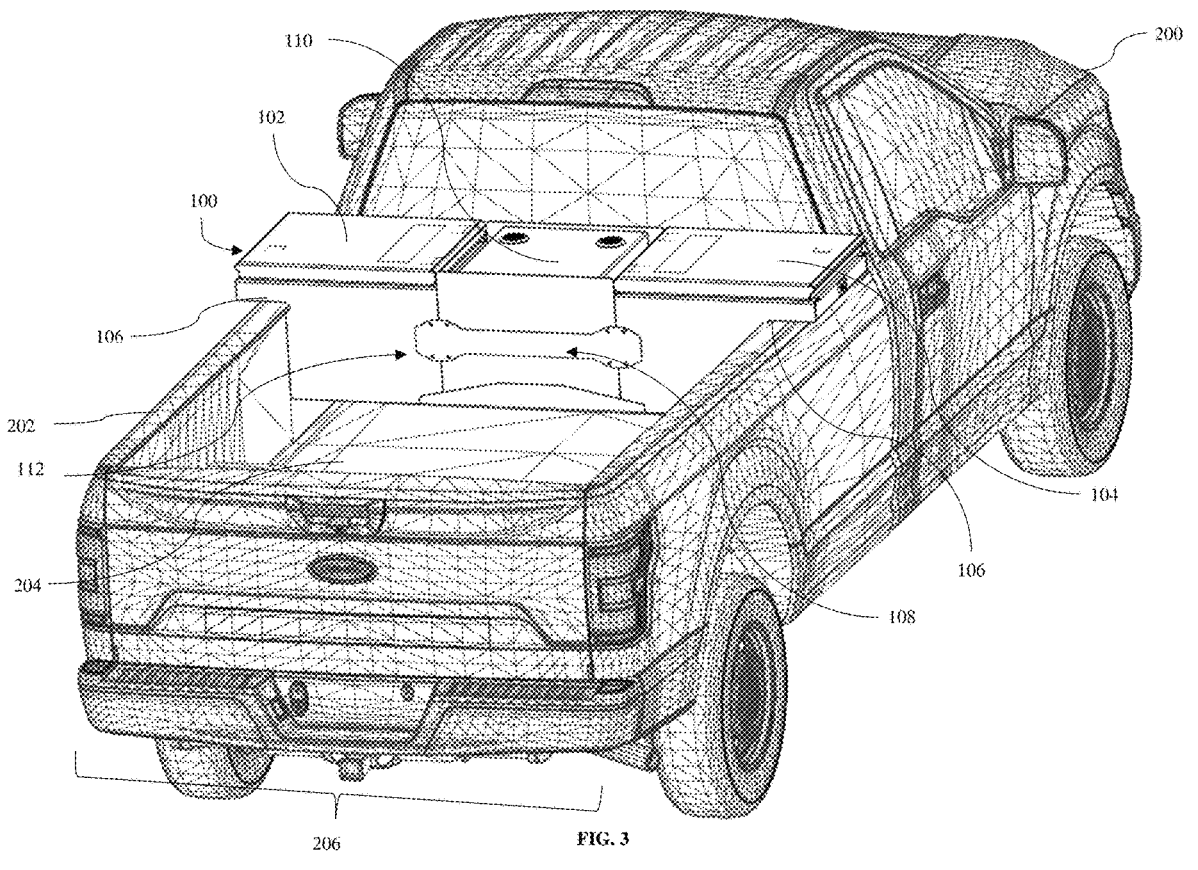
FIG. 3 is a perspective view of a modular truck bed storage system in a third example embodiment of an assembled configuration, according to an example embodiment.
Figure 4:
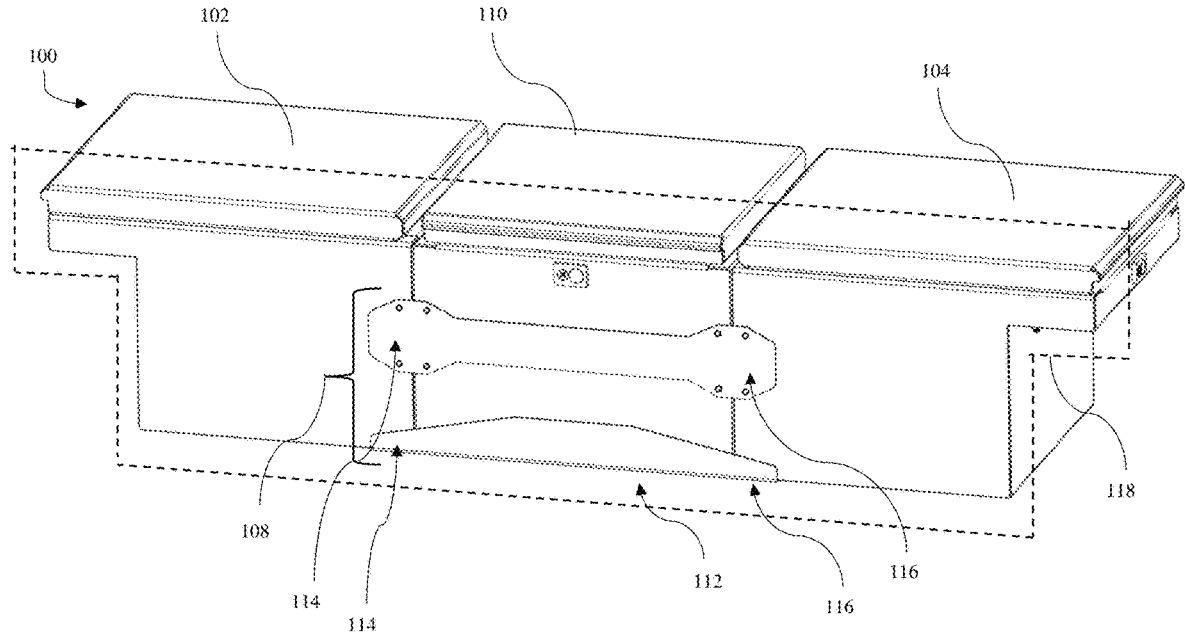
FIG. 4 is a side perspective view of the first example embodiment of an assembled configuration, illustrating the unitary structure, according to an example embodiment.

Referring now to the Figures, FIGS. 1-3 illustrate perspective views of a modular truck bed storage system (100) in three example embodiments of an assembled configuration, installed within a truck bed (204) of a vehicle (200).

The modular truck bed storage system (100) includes a first storage container (102) and a second storage container, each positioned opposite one another in the truck bed and secured to a connector assembly (108) such that the first storage connector is coupled to the connector assembly at a first end portion 114 of the connector assembly and the second storage container is coupled to the connector assembly at the second end portion 116 of the connector assembly. The connector assembly structurally secures the first storage container and the second storage container together to form a substantially unitary structure (112).

The term "substantially unitary structure" refers to the assembled configuration in which the first storage container, second storage container, and connector assembly are structurally interconnected to function as a cohesive, integrated system, rather than as discrete, loosely connected elements. The qualifier "substantially" acknowledges that while the structure may include modular or removable components, such as an interchangeable module (110), the overall system remains structurally stable and functionally unified when assembled. This ensures that even when the interchangeable module is removed, the first storage container and second storage container remain securely connected to form a single, robust structure.

Figure 14:
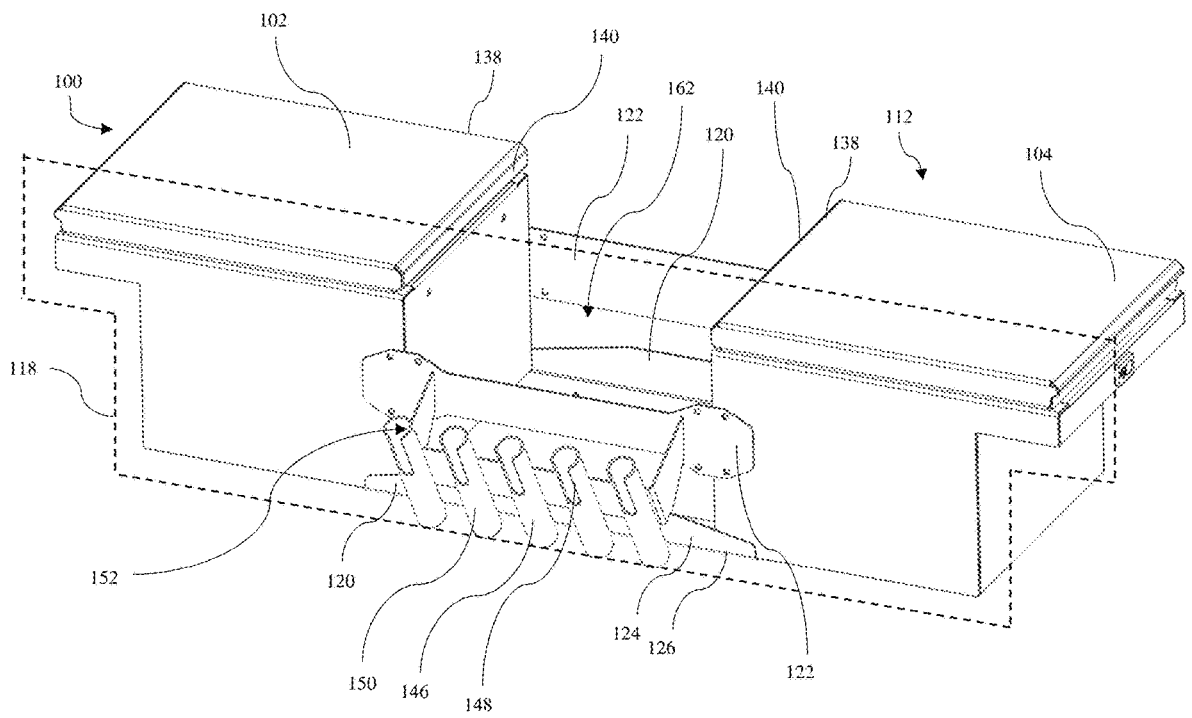
FIG. 14 is a side perspective view of the second example embodiment of an assembled configuration, illustrating the cooler and/or live well interchangeable module, according to an example embodiment.

As shown in FIG. 14, the substantially unitary structure is maintained through the secure attachment of the first storage container and the second storage container to the connector assembly, which includes a base plate (120) and a crossbar (122). The base plate (120) provides a foundation that reinforces the connection between the storage containers, while the crossbar (122) further stabilizes the system by spanning the width of the storage containers. This configuration allows for load distribution and impact resistance, ensuring that the storage system remains secure and operational even under heavy use or rough terrain.

The substantially unitary structure offers several advantages over prior art storage solutions. Traditional truck bed storage systems often consist of individual, unconnected storage compartments, which may shift during vehicle movement, causing rattling, instability, or potential damage. In contrast, the integrated design of the disclosed system prevents unwanted movement, enhancing both durability and security. Additionally, the ability to remove and replace the interchangeable module without compromising the unitary nature of the system allows for customization and adaptability, making the storage system suitable for a variety of user needs.

In alternative embodiments, the substantially unitary structure may be achieved without an interstitial space between the storage containers. For example, extended or lengthened storage containers may be used to directly interface with the connector assembly, forming a fully enclosed unit while maintaining the same level of structural cohesion. This flexibility allows users to configure the system based on their specific storage and space requirements, providing an improvement over rigid, non-adaptable prior art designs.

The first storage container (102) and second storage container (104) are enclosures defining interior volumes for storing items. Each storage container includes a shoulder portion (106) extending outwardly from an upper section of the container. The shoulder portion refers to a structural extension or protrusion on each of the first storage container and second storage container that is specifically designed to engage with the truck bed wall of the vehicle. This engagement provides support and stability, preventing unintended movement of the storage containers within the truck bed (204 shown in FIGS. 1-3).

Figure 7:
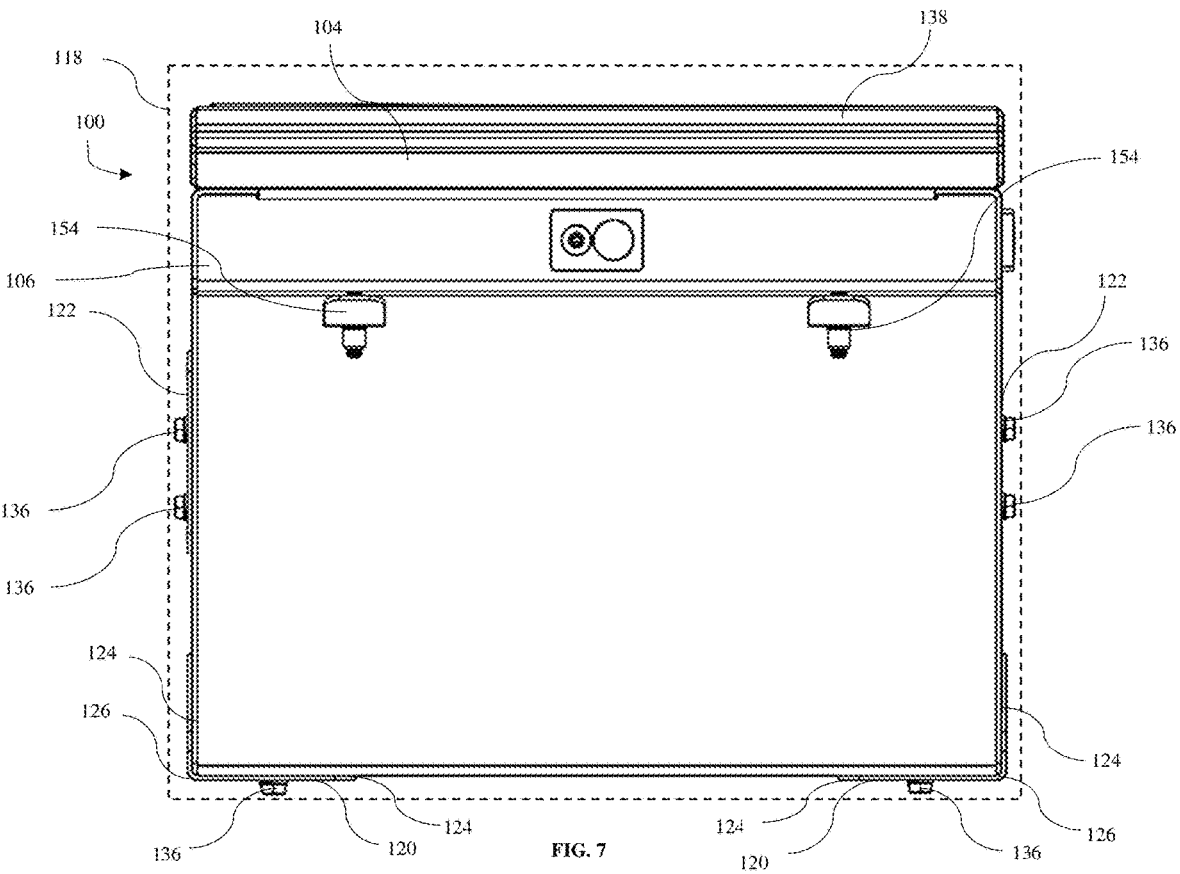
FIG. 7 is a side view of the first example embodiment of an assembled configuration, illustrating a fastener disposed on the underside of the shoulder portion of the storage container, according to an example embodiment.
Figures 8, 9:
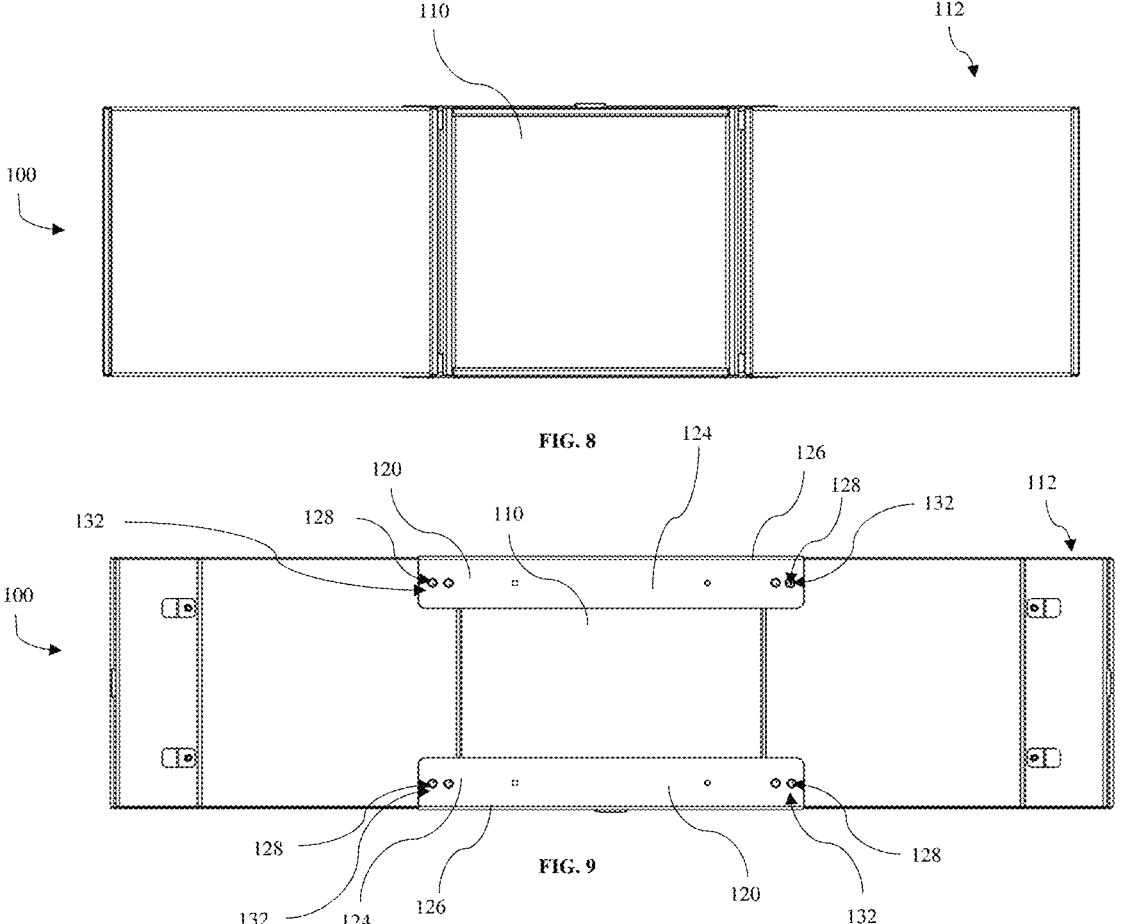
FIG. 8 is a top view of the first example embodiment of an assembled configuration, illustrating the first storage container, the second storage container, and the interchangeable module, according to an example embodiment.
FIG. 9 is a bottom view of the first example embodiment of an assembled configuration, illustrating attachment points and fastening locations, according to an example embodiment.

As shown in FIGS. 1-3, the shoulder portion extends laterally outward from the upper section of each storage container and is positioned to rest on top of the truck bed wall (202). This positioning allows the storage containers to be elevated above the truck bed floor, thereby optimizing the available storage space beneath and around the containers. The underside of the shoulder portion may include fasteners (154), as seen in FIG. 7, which secure the storage containers to the truck bed wall, enhancing overall stability. Said fastens are mechanical securing elements that attach the first storage container and second storage container to the truck bed wall via the shoulder portion. The fasteners ensure that the storage containers remain stably positioned within the truck bed, thereby preventing unintended shifting or displacement during vehicle operation. The fasteners are disposed on the underside of the shoulder portion. The fasteners may be configured as bolts, threaded inserts, clamps, locking pins, or quick-release latches, depending on the desired level of permanence and accessibility. These fasteners may interact with corresponding mounting points on the truck bed wall, allowing for a secure yet removable attachment. The fasteners function to anchor the storage containers without requiring permanent modifications to the vehicle. In some embodiments, the fasteners may include rubberized or polymer gaskets to reduce vibration and noise, thereby enhancing durability and user comfort. By anchoring the first storage container and second storage to the truck bed wall, the shoulder portion contributes to the load distribution and vibration resistance of the entire system. This ensures that even under vehicle movement, heavy payloads, or rough terrain, the storage containers remain securely positioned within the truck bed.

Each storage container may be formed from a durable material, such as injection-molded polymer, reinforced composite materials, aluminum, or steel, depending on weight constraints and durability requirements. The exterior surfaces may include weatherproof coatings or seals to protect against moisture, dust, and debris. The storage containers may be manufactured as single-molded units or fabricated from multiple panels that are fastened or welded together. One advantage over the prior art is that conventional truck bed storage systems are typically fixed or require permanent modifications to the truck bed. The disclosed storage containers (102, 104) are modular, allowing quick installation, removal, and reconfiguration without permanently altering the truck bed.

Referring now to the connector assembly (108), the connector assembly is positioned between and structurally secures the first storage container and the second storage container. The connector assembly is one or more structural components that join and secure the first storage container to the second storage container to define an assembled configuration, such as those shown in FIGS. 1-3. The connector assembly serves as a centralized attachment mechanism, ensuring that the storage containers remain rigidly secured while also allowing for the removable retention of an interchangeable module (110) in certain embodiments.

As shown in FIGS. 5-9, the connector assembly (108) includes a base plate (120) and a crossbar (122). The base plate is positioned at a lower portion of the system (100) and provides anchoring support, while the crossbar extends laterally between the first and second storage containers to provide additional reinforcement. The base plate (120) and crossbar (122) may be constructed from high-strength materials, such as steel, aluminum, or composite materials, to ensure durability and load-bearing capacity.

As shown in the example embodiments, the connector assembly includes two base plates (120), positioned each on the front and rear sides of the assembly. Each base plate is affixed to both the first and second storage containers via fasteners (136) that pass through openings (126) of the base plate. Each of these base plates have flanges (124) that extend laterally from one end of the base plate to the other to secure the first and second storage containers. The flanges are lateral extensions of the base plate that provide mounting surfaces for securing the connector assembly to the first storage container, the second storage container, and, in some embodiments, the truck bed. The flanges extend outwardly along the bottom edge of the base plate and include openings (128) that align with corresponding openings (132, 134) on the storage containers, allowing for fastener-based attachment.

In certain embodiments, the base plate may extend continuously across the bottom portion of the system (100) in the assembled configuration, thereby forming a foundation spanning the interstitial space between the first storage container and the second storage container. This extended base plate not only structurally joins the storage containers but also provides a load-bearing platform for retaining an interchangeable module or other stowed items within the interstitial space. Unlike embodiments where the base plate is positioned only at the edges, this configuration ensures that any inserted module or cargo is fully supported.

The base plate may be fabricated from high-strength materials, such as steel, aluminum, or reinforced composite materials, ensuring high structural integrity while maintaining weight efficiency. The surface of the base plate may include non-slip coatings, drainage holes, or integrated attachment points to accommodate different types of interchangeable modules such as storage containers, toolboxes, coolers, or live wells.

The crossbar (122) is a structural reinforcement component of the connector assembly that extends laterally between the first storage container and second storage container. The crossbar is an elongated body that functions to stabilize and reinforce the assembled configuration and connect the first storage container and the sconed storage container to form the substantially unitary body. The crossbar prevents lateral movement of the storage containers while also providing a retention interface for the interchangeable module (110).

Figures 5, 6:
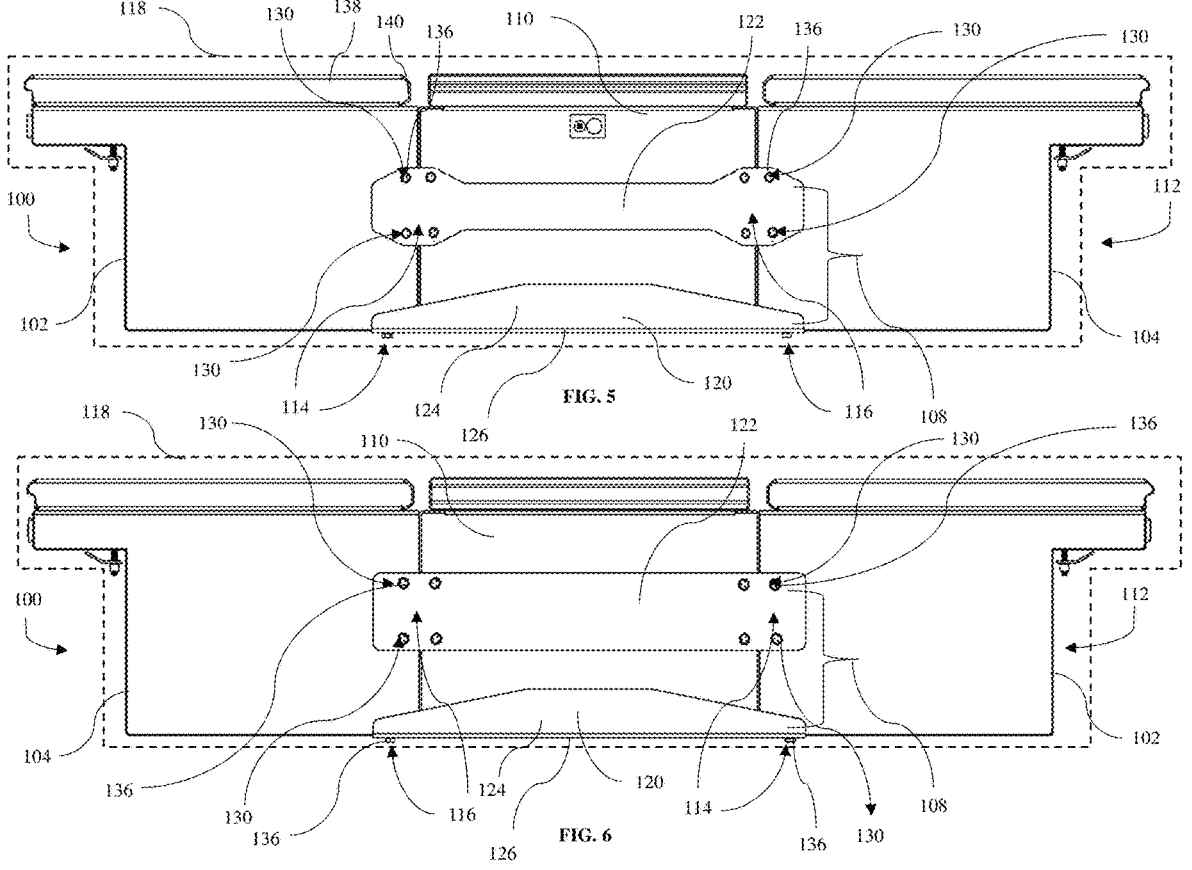
FIG. 5 is a front view of the first example embodiment of an assembled configuration, illustrating the arrangement of the first storage container, the second storage container, and the interchangeable module, according to an example embodiment.
FIG. 6 is a rear view of the first example embodiment of an assembled configuration, illustrating the fastener arrangement securing the connector assembly, according to an example embodiment.

As shown in FIGS. 5 and 6, the connector assembly includes two crossbars (122), one positioned at the front and another at the rear of the assembly (100). These crossbars structurally link the storage containers and are secured in place via fasteners (136) that pass through aligned openings (130) in the crossbars and corresponding attachment points on the first storage container and second storage container. This dual-crossbar configuration enhances torsional rigidity and ensures that the storage system remains stable during vehicle operation, even under load or movement.

In certain embodiments, the crossbar may also function as a retention feature for the interchangeable module. The crossbar may include engagement slots, locking recesses, or adjustable brackets configured to securely hold an interchangeable module in place while allowing for removal and replacement as needed.

The crossbar may be manufactured from high-strength materials, such as powder-coated steel, extruded aluminum, or reinforced polymer composites, depending on desired strength-to-weight ratio and durability. The surface of the crossbar may include coatings or protective finishes to enhance corrosion resistance, particularly in outdoor and off-road applications where exposure to moisture, dirt, and debris is a concern.

In certain embodiments, the first storage container and the second storage container may be configured to interlock directly with each other, and/or with the interchangeable module, through integrated mechanical engagement features that collectively define the connector assembly without requiring a separate structural component. These interlocking features may include male and female engagement members, such as dovetail joints, alignment rails, clips, latches, or keyed slots, allowing the storage components to securely engage while maintaining a substantially unitary structure in the assembled configuration.

In one contemplated embodiment, the first storage container and the second storage container may include complementary interlocking profiles along their facing sidewalls, allowing them to snap-fit, slide, or otherwise engage with one another when positioned in the truck bed. These interlocking features may take the form of tongue-and-groove configurations, recessed channels, or molded guide rails, ensuring precise alignment and preventing unwanted separation during vehicle operation. In some embodiments, the interchangeable module may also include corresponding interlocking features, enabling it to be secured between the first and second storage containers without additional brackets or fasteners.

In certain embodiments, the interchangeable module is at least partially retained by the connector assembly between the first end portion and the second end portion thereof. As used herein, "at least partially retained" refers to a configuration in which a portion of the interchangeable module—such as a wall, base, or protruding structural feature—is held in place, aligned, or constrained by at least a portion of the connector assembly. In the example embodiments shown in FIGS. 1-4 and 13-15, the connector assembly extends laterally between the first and second storage containers and defines an interstitial space between the first end portion and the second end portion. The interchangeable module may be seated within this interstitial space, with its sides, base, or internal support structure being engaged by one or more components of the connector assembly, such as the crossbar, base plate, or optional retention features like flanges, brackets, or recesses. In certain embodiments, the connector assembly may include openings or mechanical fasteners that interface with corresponding features on the interchangeable module to provide removable retention. The partial retention provided by the connector assembly facilitates modularity while ensuring structural coherence and lateral stability during transit or use. Unlike traditional truck storage solutions that rely on fixed compartments or bulk enclosures, this configuration enables tool-free insertion and removal of utility modules without compromising the continuity of the unitary structure.

Additionally, in certain embodiments, the storage containers and interchangeable module may incorporate clasp-and-latch mechanisms that provide positive retention and quick-release functionality. For example, one container may include spring-loaded clasps, locking hooks, or over-center latches, while the adjacent container or interchangeable module features corresponding catch recesses or engagement loops. This configuration allows the containers to be locked together securely while still permitting rapid disassembly and reconfiguration when needed.

In further contemplated embodiments, rotational locking mechanisms or cam-lock interfaces may be integrated into the first storage container, second storage container, and interchangeable module. These may include twist-to-lock connectors, quarter-turn fasteners, or push-button release mechanisms, enabling the components to be securely engaged while allowing for tool-free detachment and swapping of interchangeable modules.

In such embodiments, by incorporating interlocking and self-securing features into the storage containers and interchangeable module, the system eliminates the need for separate, external brackets or complex mounting hardware, distinguishing it from prior art truck bed storage solutions that rely on permanent fasteners, drilling, or independent attachment assemblies. This approach enhances modularity, stability, and ease of installation, allowing users to customize and reconfigure their truck bed storage system without compromising structural integrity or security.

Referring now to FIGS. 4-6, 14, 15, and 17, the modular truck bed storage system (100) defines a substantially continuous profile (118) in the assembled configuration. The term "substantially continuous profile" refers to the overall external shape formed by the first storage container, second storage container, and connector assembly, which together present a visually and structurally cohesive form that spans the width of the truck bed (206 in FIGS. 1-3). The term "substantially continuous profile" refers to the overall external shape formed by the first storage container, second storage container, and connector assembly in the assembled configuration. The term "substantially" in this context allows for the presence of minor discontinuities, such as seams, gaps, or modular interfaces, while maintaining an overall cohesive and uniform structural appearance. The connector assembly maintains the substantially continuous profile by providing a structural bridge between the first storage and the second storage container. In some embodiments, the substantially continuous profile is achieved by positioning the first storage container and the second storage container on opposite end portions (114, 116 in FIGS. 4-6) of the connector assembly, such that the entire system forms a shape that extends across the width (206 in FIGS. 1-3) of the truck bed without significant visual or structural interruptions.

The substantially continuous profile of the modular truck bed storage system is generally rectangular or box-like when viewed from the rear (FIG. 6), front (FIG. 5), or side (FIG. 7) of the truck bed. The profile is primarily defined by the first storage container, the second storage container, and the connector assembly, which collectively form a structure that extends across the width (206 in FIGS. 1-3) of the truck bed. The top portion of the profile is influenced by the shoulder portions of the storage containers, which provide a slightly raised, stepped, or planar surface, depending on the embodiment.

In certain embodiments, such as the one depicted in FIG. 14, the substantially continuous profile is preserved even when the interchangeable module is removed. This is due to the fact that the first storage container and the second storage container remain securely attached to the connector assembly, maintaining the overall shape and structural integrity of the system. The interstitial space (162), that is the space formed between the first storage container and the second storage container by the connector assembly, defines the central portion of the substantially continuous profile when the interchangeable module is removed. Otherwise, the interchangeable module forms part of the substantially continuous profile.

In alternative embodiments, the interstitial space may be reduced or eliminated by utilizing extended or lengthened storage containers that directly attach to the connector assembly, forming a fully enclosed, unitary unit. This variation maintains a continuous profile by ensuring that the structural alignment and visual flow of the system are uninterrupted, even when no interstitial space exists to support an interchangeable module.

Figure 10:
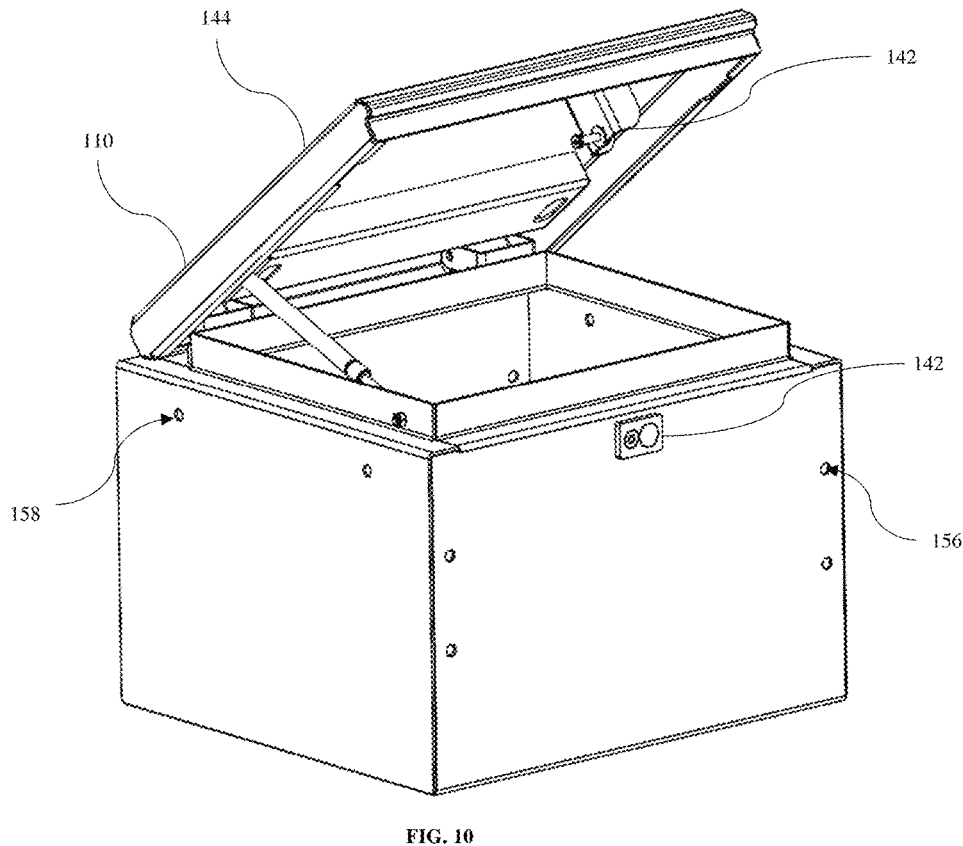
FIG. 10 is a perspective view of a first example embodiment of the interchangeable module, which is shown in the first example embodiment of the assembled configuration, according to an example embodiment.
Figure 11:
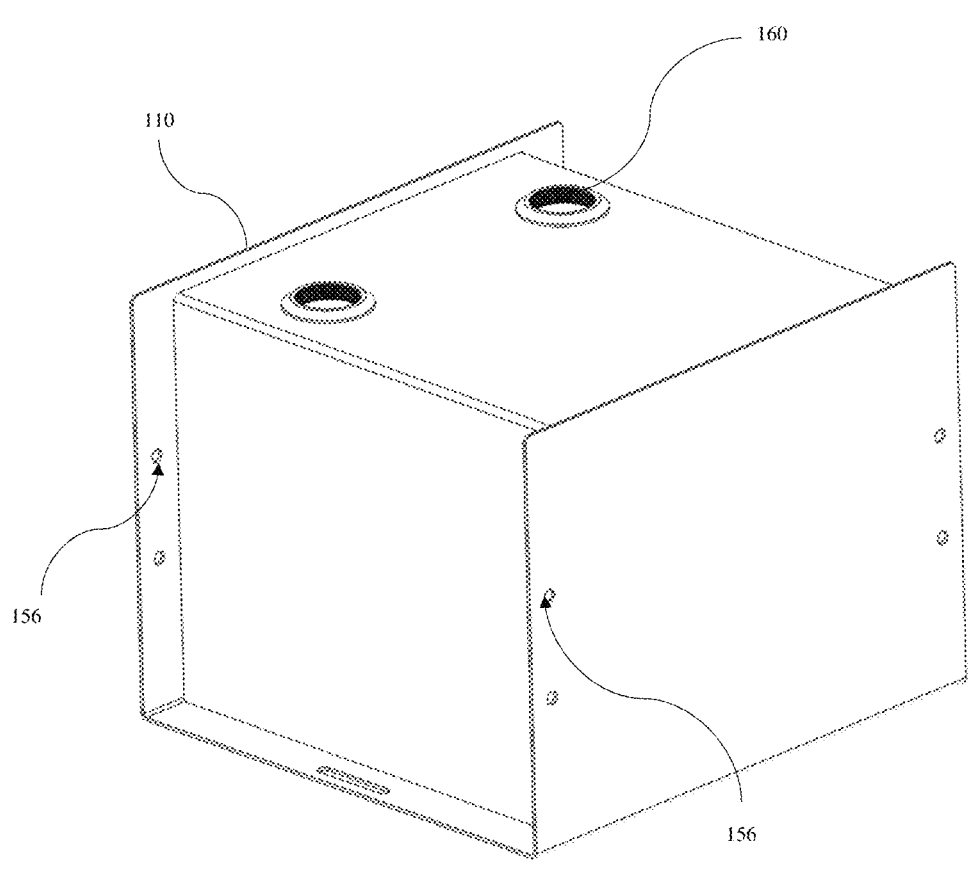
FIG. 11 is a perspective view of a second example embodiment of the interchangeable module, which is shown in the third example embodiment of the assembled configuration, according to an example embodiment.

Referring now to FIGS. 10 and 11, example interchangeable modules are shown. An interchangeable module (110) refers to a removably retained component that is configured to be positioned within the interstitial space formed between the first storage container and the second storage container in the assembled configuration of the modular truck bed storage system. The interchangeable module allows for customization and adaptability, enabling users to modify the storage system based on specific needs or applications.

In certain embodiments, the interchangeable module may be a storage container, a cooler, a live well, or any other functional insert. When configured as a storage container as shown in FIG. 10, the interchangeable module, in the assembled configuration shown in the first embodiment of FIG. 1, defines the third storage container of the system. The interchangeable module as a storage container provides additional enclosed storage space, typically including a pivotally coupled lid (144) and an independent locking mechanism (142) to secure its contents. The container includes the lid that is pivotally coupled along an upper edge of the storage container. The lid (144) is connected via hinges, which facilitate upward and outward pivotal movement, enabling easy access to the interior compartment. The hinges may be constructed from metal, reinforced polymer, or composite materials, ensuring durability and corrosion resistance in harsh environments.

Figure 13:
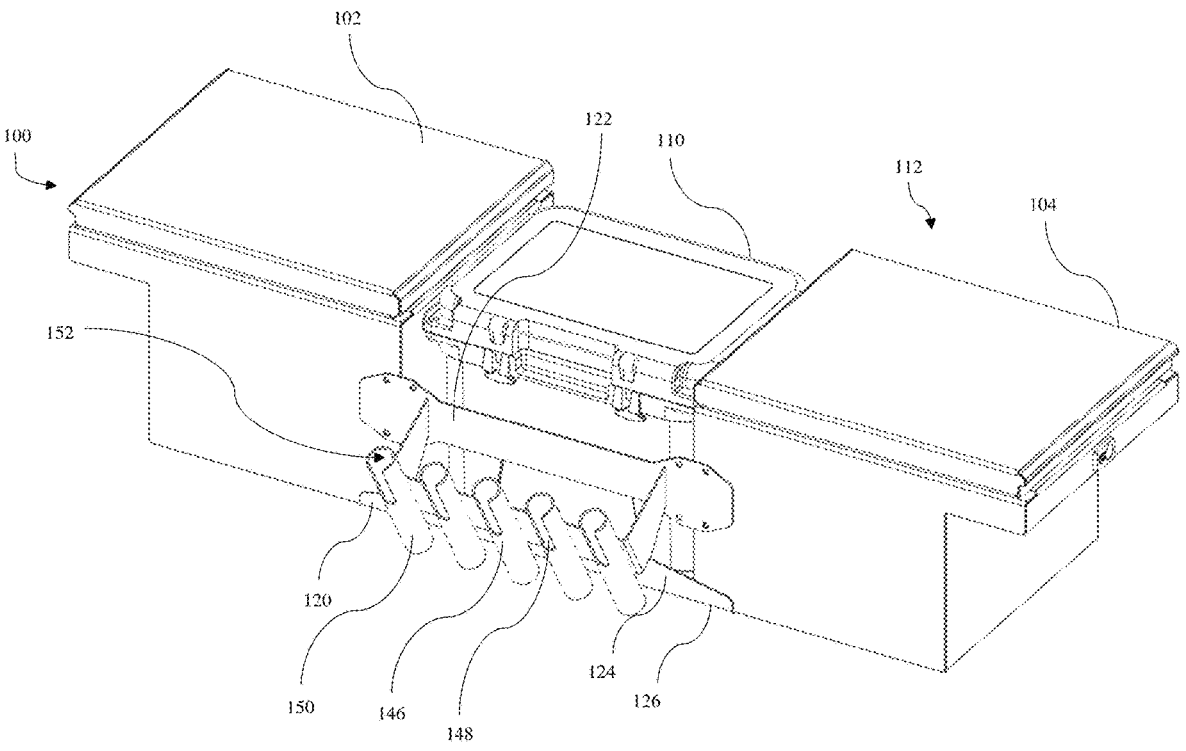
FIG. 13 is a perspective view of the second example embodiment of an assembled configuration, illustrating an interchangeable module that is a cooler and/or a live well, according to an example embodiment.
Figure 15:
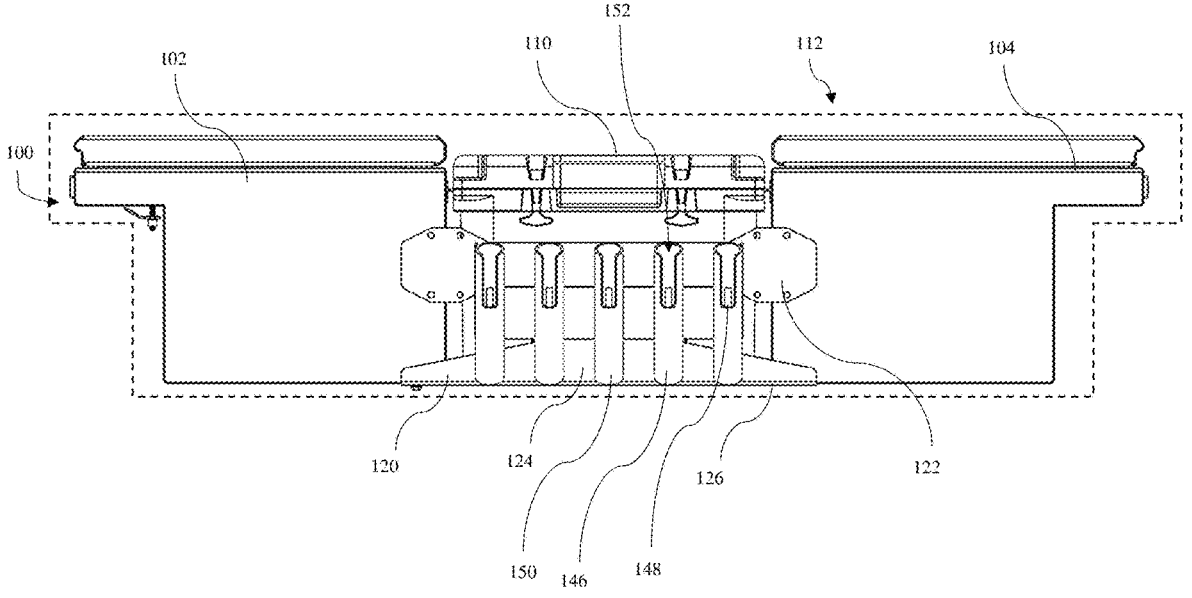
FIG. 15 is a front view of the second example embodiment of an assembled configuration, illustrating the accessory mounting interface, according to an example embodiment.

As a cooler, as shown in the second example embodiment of the assembled configuration and in FIGS. 2, 13, and 15, the interchangeable module may incorporate insulated walls, such as polyurethane foam, vacuum-sealed panels, or thermoplastic composites, to maintain a controlled internal temperature for storing perishable goods. When functioning as a live well, the interchangeable module may include fluid inlet and outlet ports to allow water circulation, preserving bait or fish during transport.

Figure 16:
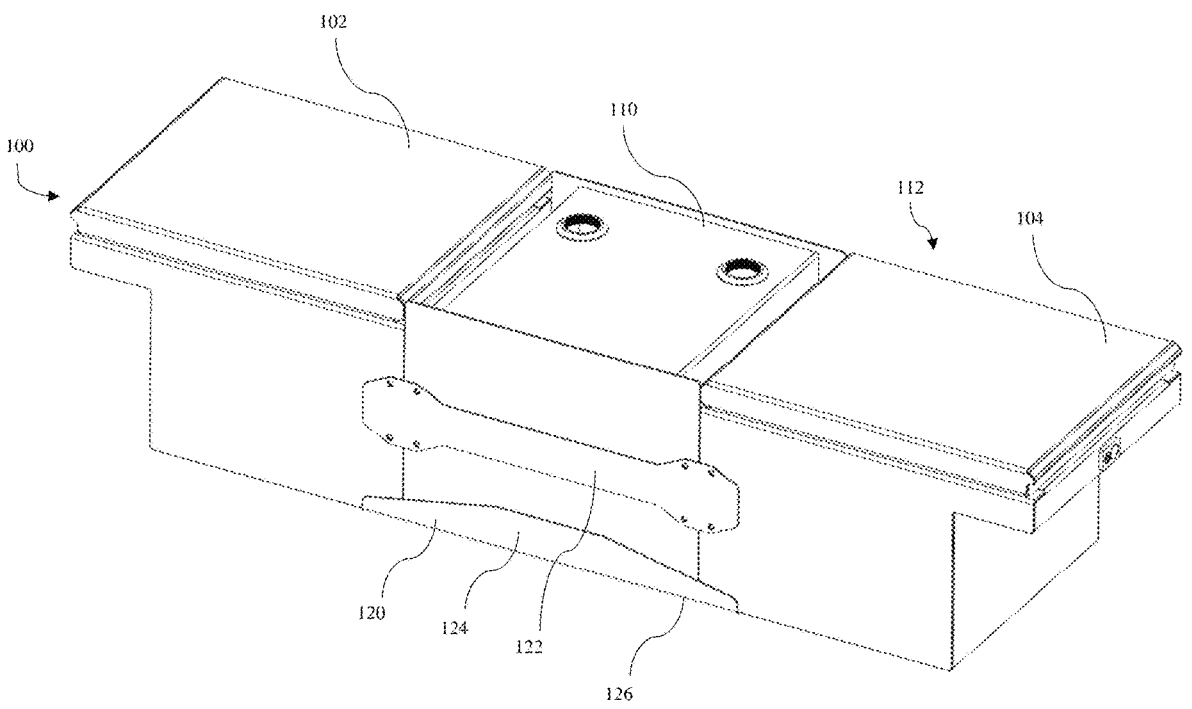
FIG. 16 is a perspective view of the third example embodiment of an assembled configuration, illustrating a different interchangeable module design, according to an example embodiment.
Figure 17:
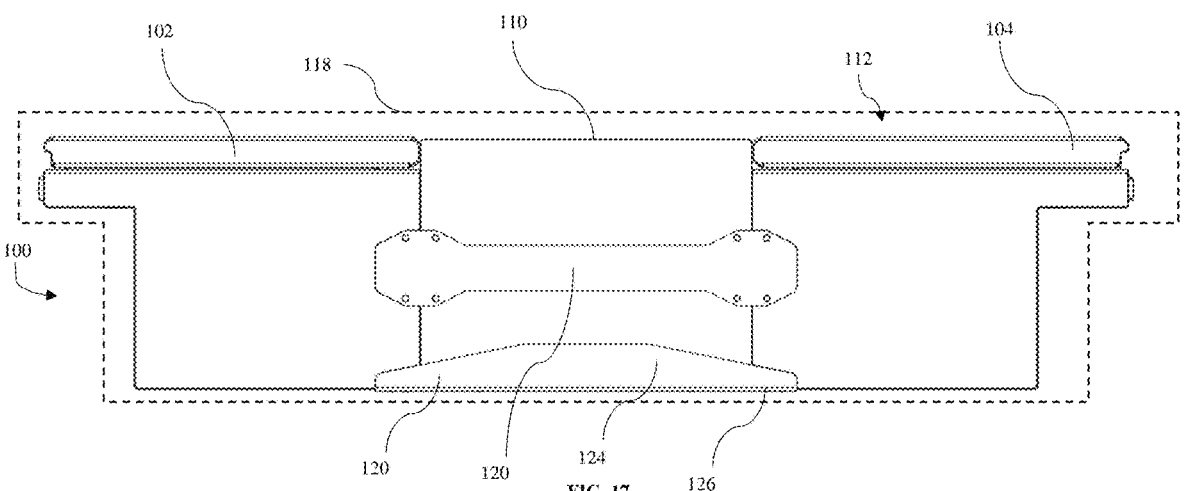
FIG. 17 is a rear view of the third example embodiment of an assembled configuration, illustrating the unitary structure with the interchangeable module, according to an example embodiment.

The interchangeable module interacts with the connector assembly, which is configured to retain and secure the module between the first and second storage containers. The module may include openings (156) for attachment to the connector assembly and openings (158) for selective attachment to either or both of the first storage container and the second storage container. These attachment mechanisms prevent unwanted shifting while still allowing the user to easily insert, remove, or replace the module as needed. As shown in FIG. 11, the interchangeable module may also have cup holders 160 on a top surface of the interchangeable module. The third embodiment of the assembled configuration having the interchangeable module of FIG. 11 is shown in FIGS. 16-17.

The interchangeability of the module provides significant advantages over prior art storage solutions, which often consist of fixed compartments that lack adaptability. Traditional truck bed storage systems do not allow for modular reconfiguration, requiring users to install separate accessories to achieve similar functionality. In contrast, the present system improves efficiency, customization, and usability by integrating a removable storage solution within the unitary structure while maintaining a substantially continuous profile.

Figure 12:
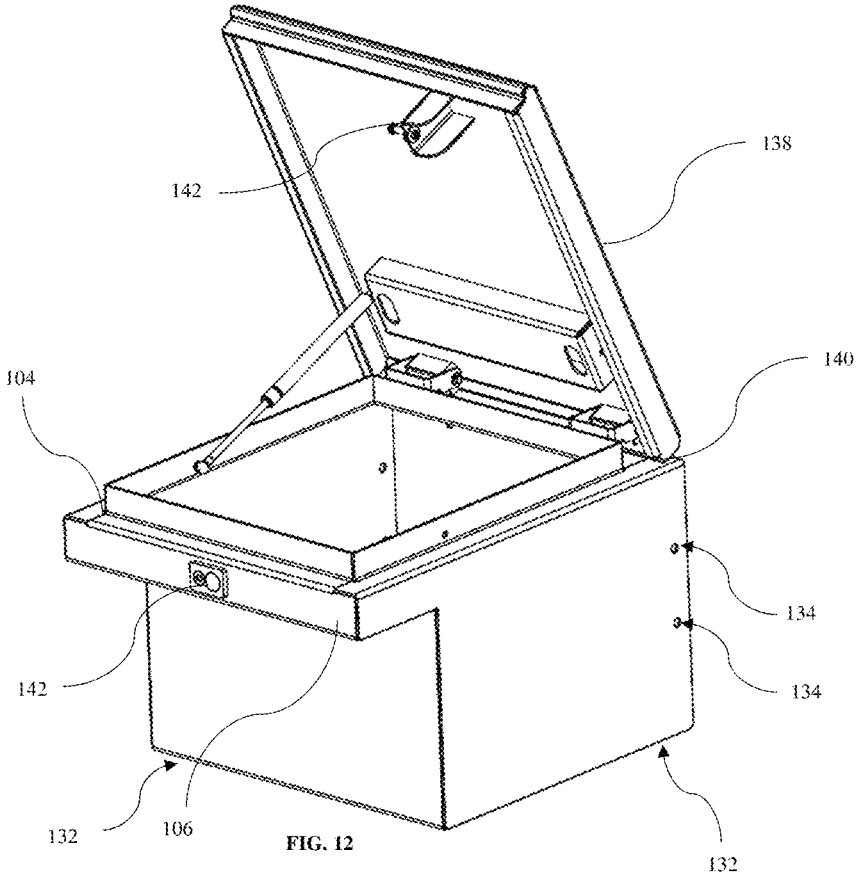
FIG. 12 is a perspective view of a storage container with a pivotally coupled lid, according to an example embodiment.

Referring now to FIG. 12, a detailed perspective view of the second storage container (104) is illustrated with its lid (138) in an open configuration, revealing the interior compartment. The second storage container (104) is designed to provide secure storage within the modular truck bed storage system (100) and is configured to be mounted along a truck bed wall (202) via its shoulder portion (106). It is understood that FIG. 12 may also be representative of the first storage container (102). In certain embodiments, the first storage container may have a substantially similar structure and functionality as the second storage container, including a shoulder portion for engaging with a truck bed wall, reinforced sidewalls, a bottom portion, and a pivotally coupled lid attached along an inner edge via hinges.

The storage containers (102, 104) include multiple openings (132, 134) positioned along their respective side surfaces to facilitate secure attachment to the connector assembly (108). The first set of openings (132) is located along a lower portion of each storage container, aligning with corresponding openings (128) on the base plate (120) in the assembled configuration. These openings (132) allow for fasteners (136) to be inserted through said openings to fasten the storage containers to the base plate, thereby securing the containers to the lower support structure of the connector assembly.

The second set of openings (134) is positioned along an intermediate or upper portion of the side surfaces of the storage containers (102, 104). These openings (134) are designed to align with corresponding attachment points or openings (130) on the crossbar (122), allowing the crossbar to provide lateral reinforcement between the first storage container and second storage container. In certain embodiments, threaded inserts, bolts, rivets, or other mechanical fasteners may be utilized to secure the crossbar to the storage containers, ensuring a rigid connection that enhances the structural integrity of the assembled system (100).

The arrangement of the openings (132, 134) contributes to the substantially unitary structure (112) of the system by structurally interconnecting the storage containers with the connector assembly. This configuration allows for efficient load distribution and prevents shifting or movement of the storage containers during transport. Additionally, in some embodiments, the openings (132, 134) may be elongated or slotted to allow for adjustability, accommodating different truck bed dimensions or enabling modular expansion of the storage system.

The lid (138) is pivotally coupled to the storage container along an inner edge (140) via a set of hinges. This hinged configuration enables the lid to pivot upward and outward, allowing easy access to stored items while maintaining a low-profile design when closed. The hinges may be constructed from corrosion-resistant metals, reinforced polymer materials, or composite materials, ensuring durability and long-term reliability in various environmental conditions. As shown in the assembled configurations, the inner edge (140) is oriented toward middle of the assembly, proximate to where the respective storage container is coupled to the connector assembly.

In operation, the lids of both storage containers pivot upward and outward relative to the modular truck bed storage system. Specifically, when in the assembled configuration, the first storage container lid pivots toward the left side of the vehicle, while the second storage container lid pivots toward the right side of the vehicle. This outward-opening configuration allows for unobstructed access to the contents of each storage container, even when an interchangeable module is positioned in the interstitial space between the storage containers. The outward-opening design improves ergonomics and accessibility by allowing a user to access each storage container from the sides of the truck bed rather than requiring access from the rear of the vehicle. Additionally, because the lids pivot upward, they do not extend into the truck bed interior, preserving storage space for additional cargo. In certain embodiments, the lids may be equipped with gas struts or torsion springs to provide assisted opening and closing, ensuring that the lid remains in an open position without requiring the user to hold it. The hinges may be constructed from corrosion-resistant materials, such as stainless steel or reinforced polymer, to withstand exposure to harsh weather conditions and road debris.

In other contemplated embodiments, the lids of the first storage container and second storage container may be pivotally coupled along an outer edge instead of the inner edge. In such configurations, the lids pivot downward toward the truck bed, allowing access from the rear of the vehicle rather than the sides. This embodiment may be beneficial for users who prefer a drop-down access mechanism, similar to a traditional tailgate, for easier loading and unloading of stored items. Additionally, in some embodiments, the lids may be fully removable, allowing for complete open access to the container interior.

Further, while the first storage container and second storage container are described primarily as storage containers, other alternative embodiments of these components may exist. For example, instead of a traditional enclosed storage compartment, the containers may be configured as tool racks, open shelving units, utility compartments, battery enclosures, fluid storage tanks, or specialized equipment housings while still maintaining the shoulder portions configured to engage with the truck bed wall. These alternative embodiments allow the modular system to be adapted for various industries, including construction, outdoor recreation, overlanding, emergency response, and mobile workshop applications.

Regardless of the specific configuration, all embodiments contemplate a design where the first and second storage containers remain securely attached and are connected via the connector assembly, forming a substantially unitary structure with a substantially continuous profile that spans across the width of the truck bed.

The first storage container and second storage container each include L-shaped side walls that define the overall structure and support features of the storage container. Each side wall consists of a vertical portion that extends upward from the bottom portion of the storage container and a horizontal portion that extends laterally outward to form the shoulder portion. The shoulder portion is configured to engage with the truck bed wall when the storage container is installed in the assembled configuration, providing additional support and load distribution along the upper edge of the truck bed.

The L-shaped design of the side walls enhances the structural integrity of the storage container by creating reinforced corner sections, which provide improved resistance to impact forces and lateral loads during vehicle movement. In certain embodiments, the vertical portion may include integrated reinforcement ribs, brackets, or gussets to further enhance load-bearing capacity and rigidity. Additionally, the horizontal portion of the shoulder portion may incorporate fastener openings or molded attachment points for securing the storage container to the truck bed wall.

The walls of the storage container may be formed from various high-strength materials, including steel, aluminum, heavy-duty polymer, or composite materials, depending on weight, durability, and environmental resistance requirements. In certain embodiments, the inner and outer surfaces of the storage container walls may be coated with weatherresistant finishes, such as powder coating, anodization, or UV-stabilized polymers, to protect against corrosion, moisture exposure, and impact damage.

Each of the storage containers (102, 104) and/or the interchangeable module may include a locking mechanism (142). The locking mechanism is configured to independently secure the storage containers and/or the interchangeable module within the modular truck bed storage system. In certain embodiments, each storage container and interchangeable module is equipped with an independent locking mechanism that enables the user to selectively lock and unlock individual compartments without affecting the security of adjacent components. The locking mechanism may include keyed locks, combination locks, electronic locking systems, or biometric locks, depending on the desired level of security.

The independent nature of the locking mechanism allows for compartmentalized access, meaning that one container can be accessed while the others remain locked. This provides enhanced security by preventing unauthorized access to specific compartments, particularly in situations where the system is used for tool storage, firearms storage, or other valuable equipment. Additionally, in some embodiments, the locking mechanism may be designed to interface with a vehicle's central locking system, allowing for remote locking and unlocking via a vehicle key fob or mobile application.

In other contemplated embodiments, the storage containers and the interchangeable module may be configured with an interlocking lid system, wherein the lids of all compartments engage with one another in a nested or overlapping manner. In such embodiments, a single locking mechanism may be employed to simultaneously secure all components of the system. This interlocking system ensures that unlocking one container provides access to all compartments, streamlining entry and closure operations while maintaining security.

Further, in some embodiments, the interlocked lids may be configured to function as a unitary lid, wherein opening one lid causes the simultaneous opening of all adjacent lids in a coordinated manner. This feature enhances ease of access, particularly in worksite applications, outdoor expeditions, or emergency response scenarios, where quick retrieval of stored items is essential. The unitary lid configuration may utilize hinged connections, internal linkage mechanisms, or mechanical actuators to ensure synchronized movement across all storage compartments.

Referring now to FIGS. 13-15, the modular truck bed storage system incorporates an accessory mounting interface (146) that provides an adaptable structure for securing additional components and attachments. The accessory mounting interface is disposed on at least one of the first storage container, the second storage container, or the connector assembly, and provides predefined attachment points (148) that allow users to secure external equipment. The accessory mounting interface is a structural feature integrated into the modular truck bed storage system that provides designated attachment points (148) for securing various accessories. This interface is designed to accommodate multiple types of attachments without modifying the core structure of the first storage container, the second storage container, or the connector assembly. As shown in the example embodiments, the accessory mounting interface is positioned on, or forms part of, the connector assembly, particularly along the crossbar (122), enabling users to attach a variety of accessories without interfering with the first storage container, the second storage container, or the interchangeable module.

The example accessory mounting interface shown includes tubular bodies (150) defining cylindrical openings (152), which are dimensioned to receive standardized mounting hardware, thereby accommodating a variety of accessories such as fishing rod holders, tool racks, gun mounts, lighting fixtures, or cargo tie-down points. In certain embodiments, the tubular bodies extend outwardly from and are offset from the connector assembly. The cylindrical openings may be oriented in different directions to allow for vertical, angled, or horizontal accessory mounting configurations. The tubular bodies may be fixedly secured to the connector assembly through welding, fasteners, or integral molding, or in some embodiments, they may be removably or adjustably attached to allow for repositioning based on user preferences. The accessory mounting interface may be manufactured from high-strength materials, such as steel, aluminum alloys, reinforced polymer composites, or anodized metals, selected for durability, weather resistance, and load-bearing capacity. The cylindrical openings may be machined, molded, or extruded, depending on the material and manufacturing method, ensuring precise tolerances and secure accessory retention.

Other accessory mounting interfaces may include varied configurations and attachment mechanisms to accommodate different user needs and accessory types. In some embodiments, the accessory mounting interface may include a rail system or track assembly integrated along the connector assembly, the first storage container, or the second storage container. Such a system may allow slidable and repositionable accessory mounts, enabling users to adjust accessory placement along the length or width of the truck bed storage system without requiring tools or permanent modifications. This provides the system with a cargo management system having tie-down points, or adjustable shelving units.

Additionally, in certain embodiments, the accessory mounting interface may include a modular panel system with pre-drilled mounting holes, threaded inserts, or quick-attach brackets, allowing for secure bolt-on or clip-on accessory integration. These panels may be removably attached to the crossbar or the side walls of the storage containers, enabling customizable mounting options for equipment such as shovel mounts, fire extinguisher brackets, recovery gear storage, or panels for tactical applications.

In other embodiments, the accessory mounting interface may comprise a magnetic or suction-based mounting system, particularly for accessories that require temporary or repositionable attachment, such as work lights, magnetic tool holders, or removable storage compartments. Such a configuration allows accessories to be quickly attached and detached without requiring mechanical fasteners, preserving the integrity of the storage containers and allowing for dynamic reconfiguration.

Further, the accessory mounting interface may include hinged or foldable brackets that allow accessories to be stowed when not in use. For example, collapsible ladder mounts, foldable work surfaces, or retractable awnings may be integrated into the storage containers or connector assembly, enabling compact storage when the accessories are not deployed.

In yet another embodiment, the accessory mounting interface may be configured with power integration to support electrical accessories, such as LED lighting, powered refrigeration units, or battery charging docks. This may include pre-wired ports, power rails, or solar panel interfaces to provide on-the-go power solutions for work or outdoor applications.

These alternative accessory mounting interfaces further enhance the versatility, modularity, and user customization capabilities of the disclosed truck bed storage system, distinguishing it from conventional static storage solutions and providing significant functional advantages across multiple use cases, including off-road applications, professional trade work, and outdoor recreation.

The modular truck bed storage system may be provided in the form of a kit for a modular truck bed storage system. The term kit, as used herein, refers to a collection of components configured for assembly into the modular truck bed storage system in one or more end-use configurations. In some embodiments, the kit may include at least a first storage container and a second storage container, each comprising a shoulder portion configured to engage with opposing side walls of a truck bed. The kit may further include one or more connector assemblies, which may comprise a base plate, a crossbar, or both, for connecting the first and second storage containers in a fixed or semi-fixed arrangement to define a substantially unitary structure when assembled.

In various embodiments, the kit may optionally include one or more interchangeable modules, such as a third storage container, a cooler, a live well, or other utility modules. These interchangeable modules may be selectively retained between the first and second storage containers by the connector assembly or interstitial support structure defined by the containers themselves. The modularity of the kit allows users to configure the storage system according to specific use cases (e.g., tool storage, outdoor recreation, fishing, utility transport) and to replace or swap interchangeable modules as desired.

In certain embodiments, the kit may further include accessory components such as an accessory mounting interface comprising tubular bodies, fasteners, rails, or attachment points for mounting external items like fishing rod holders, utility hooks, or lighting equipment. Fasteners, hinges, latches, and locking mechanisms may also be provided as part of the kit to facilitate installation and secure operation.

This kit-based configuration allows for flat-packing or palletized shipping, thereby reducing freight and logistics costs. The system may be stored and shipped in a compact arrangement and assembled by the end user with common tools or without specialized equipment. Compared to prior art truck bed toolboxes or fixed storage bins, this kit form offers advantages in modularity, customization, interchangeability, and cost-effective distribution.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A modular truck bed storage system, comprising:
   a first storage container and a second storage container, each having a vertical wall perpendicular to a bottom wall;
   a shoulder on an upper portion of at least one of the first storage container and the second storage container;
   a lid pivotally attached to the upper portion of the first storage container that is not operatively coupled to the second storage container; and a connector in attachment with the vertical wall of each of the first storage container and the second storage container that couples the first storage container to the second storage container;
   the first storage container disposed at a first end portion of the connector and the second storage container disposed at a second end portion of the connector;
   the first storage container, the second storage container, and the connector collectively forming a substantially continuous profile that spans across a width of the truck bed in an assembled configuration; and
   an interchangeable module freely and independently removably disposed between the first storage container and the second storage container, wherein the interchangeable module is least partially retained by the connector spanning between the first storage container and the second storage container.

2. The modular truck bed storage system of claim 1, wherein each of the first storage container and the second storage container includes an independent locking mechanism.

3. The modular truck bed storage system of claim 1, further comprising the interchangeable module freely and independently removably disposed between the first storage container and the second storage container, wherein the interchangeable module is at least partially retained by the connector spanning between the first storage container and the second storage container; wherein the interchangeable module is a third storage container comprising a second lid pivotally coupled to an upper portion of the third storage container, wherein the second lid is pivotally coupled perpendicular to the lid of the at least one of the first storage container and the second storage container.

4. The modular truck bed storage system of claim 1, further comprising:
   a base plate coupled to the bottom wall of at least one of the first storage container and the second storage container; wherein the interchangeable module is disposed on the base plate.

5. The modular truck bed storage system of claim 4, wherein:
   the base plate includes a flange extending laterally along a bottom edge of the base plate, the flange having a first opening;
   the connector defines a crossbar having a second opening;
   the first storage container and the second storage container each having a third opening aligning with the first opening in the assembled configuration and a fourth opening aligning with the second opening in the assembled configuration; and
   a fastener disposed in each of the first opening, the second opening, the third opening, and the fourth opening in the assembled configuration;
   wherein at least one of the base plate and the crossbar is connected to at least two of the first storage container, the interchangeable module, and the second storage container.

6. The modular truck bed storage system of claim 1, further comprising an accessory mounting interface coupled to at least one of the connector, the first storage container, and the second storage container, the accessory mounting interface including a plurality of attachment points for mounting at least one accessory.

7. The modular truck bed storage system of claim 6, wherein the accessory mounting interface includes a plurality of tubular bodies offset from the crossbar connector each having cylindrical openings.

8. A modular truck bed storage system, comprising:

a first storage container and a second storage container, each having a shoulder portion configured to engage with a truck bed wall;

a base plate having a first opening;

a crossbar attached to a front wall of each of the first storage container and the second storage container, the crossbar having a second opening;

the first storage container and the second storage container each having a third opening aligning with the first opening in an assembled configuration and a fourth opening aligning with the second opening in the assembled configuration; and a fastener disposed in each of the first opening, the second opening, the third opening, and the fourth opening in an assembled configuration;

wherein the front wall is perpendicular to a bottom wall of each of the first storage container and the second storage container.

9. The modular truck bed storage system of claim 8, further comprising an interchangeable module removably retained by the crossbar, wherein:

the modular truck bed storage system, in an assembled configuration, comprises a space between the first storage container and the second storage container;

an interchangeable module is positioned within the space between the first storage container and the second storage container; and in the assembled configuration, the first storage container, the second storage container, the crossbar, and the interchangeable module collectively form a substantially unitary structure having a substantially continuous profile that spans across a width of the truck bed.

10. The modular truck bed storage system of claim 8, wherein at least one of the first storage container and the second storage container includes a lid pivotally coupled to the at least one of the first storage container and the second storage container along an inner edge.

11. The modular truck bed storage system of claim 8, wherein each of the first storage container and the second storage container includes a lid pivotally coupled along an inner edge; and wherein the modular truck bed storage system further comprises an independent locking mechanism disposed on each of the first storage container and the second storage container.

12. The modular truck bed storage system of claim 8, further comprising an interchangeable module removably disposed between the first storage container and the second storage container on the base plate spanning between the first storage container and the second storage container.

13. The modular truck bed storage system of claim 8, further comprising an accessory mounting interface in attachment with at least one of the crossbar, the first storage container, and the second storage container, the accessory mounting interface including a plurality of tubular bodies each having a cylindrical opening.

14. A kit for a modular truck bed storage system, comprising:

a first storage container and a second storage container, each having a shoulder portion configured to engage with a truck bed wall;

each of the first storage container and the second storage container having an opening on a front vertical wall;

an interchangeable module that is removably disposable between, and independent from, the first storage container and the second storage container;

a connector assembly comprising a base plate dimensioned to span between the first storage container and the second storage container to support the interchangeable module when assembled, a crossbar having a plurality of openings on each end portion of the crossbar to align with the opening on the vertical wall of each of the first storage container and second storage container, and a plurality of fasteners configured to couple the crossbar to the vertical wall of each of the first storage container and the second storage container such that the crossbar spans across the interchangeable module when assembled.

15. The kit for a modular truck bed storage system of claim 14 comprising an accessory mounting interface coupled to at least one of the connector assembly, the first storage container, or the second storage container.

16. The kit for a modular truck bed storage system of claim 15 wherein the accessory mounting interface comprises a plurality of tubular bodies each having a cylindrical opening.

17. The kit for a modular truck bed storage system of claim 16, wherein, in an assembled configuration the first storage container is attached to a first end portion of the connector assembly, the second storage container is attached to a second end portion of the connector assembly, and the interchangeable module is removably disposed between the first storage container and the second storage container such that the first storage container, the second storage container, the connector assembly, and the interchangeable module collectively define a substantially unitary structure having a substantially continuous profile that spans across a width of a truck bed.

* * * * *